US008446841B2

(12) United States Patent
Dhillon et al.

(10) Patent No.: US 8,446,841 B2
(45) Date of Patent: May 21, 2013

(54) COMMUNICATING INFORMATION BETWEEN CORE AND EDGE NETWORK ELEMENTS

(75) Inventors: Abinder S. Dhillon, Allen, TX (US); Michael D. White, Richardson, TX (US); Fredrick S. Gruman, Plano, TX (US); Sanjay Gera, Richardson, TX (US); Snigdho C. Bardalai, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 496 days.

(21) Appl. No.: 12/276,462

(22) Filed: Nov. 24, 2008

(65) Prior Publication Data
US 2010/0054153 A1   Mar. 4, 2010

Related U.S. Application Data

(60) Provisional application No. 61/092,167, filed on Aug. 27, 2008.

(51) Int. Cl.
H04L 12/28 (2006.01)
(52) U.S. Cl.
USPC .......................................... 370/254; 370/351
(58) Field of Classification Search
None
See application file for complete search history.

(56) References Cited

U.S. PATENT DOCUMENTS

| | | | |
|---|---|---|---|
| 6,473,421 B1 * | 10/2002 | Tappan | 370/351 |
| 7,672,253 B2 * | 3/2010 | Yang et al. | 370/255 |
| 2006/0262735 A1 * | 11/2006 | Guichard et al. | 370/254 |
| 2006/0268739 A1 * | 11/2006 | Garcia et al. | 370/254 |
| 2007/0217419 A1 * | 9/2007 | Vasseur | 370/392 |
| 2007/0260746 A1 * | 11/2007 | Mirtorabi et al. | 709/238 |
| 2008/0002664 A1 * | 1/2008 | Li et al. | 370/351 |
| 2010/0008363 A1 * | 1/2010 | Ee et al. | 370/392 |
| 2010/0208741 A1 * | 8/2010 | Vasseur | 370/400 |
| 2011/0145376 A1 * | 6/2011 | Bates et al. | 709/221 |

OTHER PUBLICATIONS

Venkata Naidu, "*OSPF TE Only Option*," Network Working Group, Internet Draft, File Name: draft-venkata-ospf-te-only-option-00.txt, http://www.potaroo.net/ietf/all-ids/draft-venkata, 6 pages, Apr. 2002.

Dahai Xu, "*Link-State Routing Can Achieve Optimal Traffic Engineering: From Entropy to IP*", INFOCOM 2008, 41 pages, Apr. 16, 2008.

\* cited by examiner

*Primary Examiner* — Chi Pham
*Assistant Examiner* — Mohammad Adhami
(74) *Attorney, Agent, or Firm* — Baker Botts L.L.P.

(57) ABSTRACT

In particular embodiments, a network element filters information sent to a neighboring network element. In the embodiments, the core network element may determine whether the neighboring network element is an edge network element or a core network element. If the neighboring network element is an edge network element, the core network element may set a filter, remove traffic engineering information according to the filter, and send the remaining information to the neighboring network element.

13 Claims, 2 Drawing Sheets

US 8,446,841 B2

COMMUNICATING INFORMATION BETWEEN CORE AND EDGE NETWORK ELEMENTS

RELATED APPLICATION

This application claims benefit under 35 U.S.C. §119(e) of U.S. Provisional Application Ser. No. 61/092,167, entitled "Communicating Information Between Core and Edge Network Elements," filed Aug. 27, 2008, by White et al.

TECHNICAL FIELD

This invention relates generally to the field of communication networks and more specifically to communicating information between core and edge network elements.

BACKGROUND

A network may have core and edge network elements. Typically, the core and edge network elements communicate information between each other to provide telecommunications services.

SUMMARY OF THE DISCLOSURE

In particular embodiments, a network element filters information sent to a neighboring network element. In the embodiments, the core network element may determine whether the neighboring network element is an edge network element or a core network element. If the neighboring network element is an edge network element, the core network element may set a filter, remove traffic engineering information according to the filter, and send the remaining information to the neighboring network element.

Certain embodiments of the invention may provide one or more technical advantages. A technical advantage of one embodiment may be that a core network element filters information sent to an edge network element. Filtering the information reduces the amount of information that is transmitted, which may allow for space to transmit other information.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
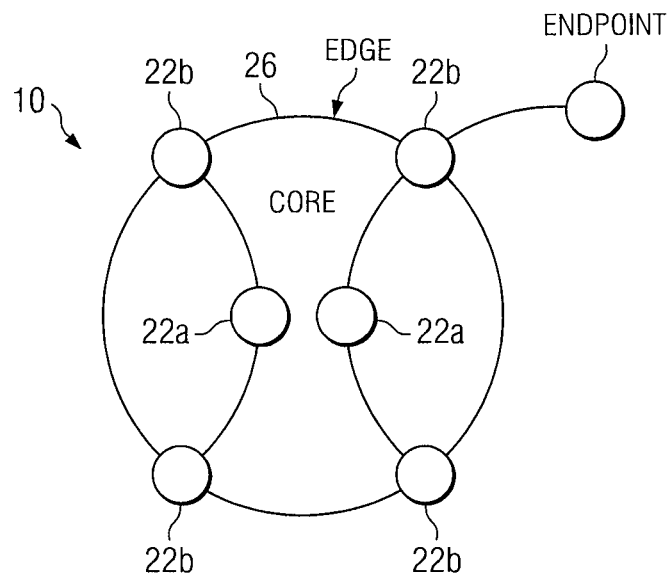
FIG. 1 illustrates an embodiment of a network that includes core and edge network elements.
Figure 2:
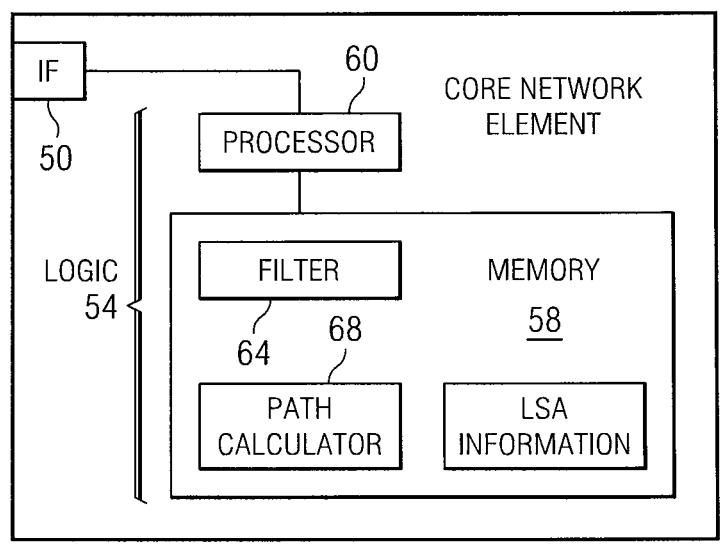
FIG. 2 illustrates one embodiment of a core network element that may be used with the network of FIG. 1.
Figure 3:
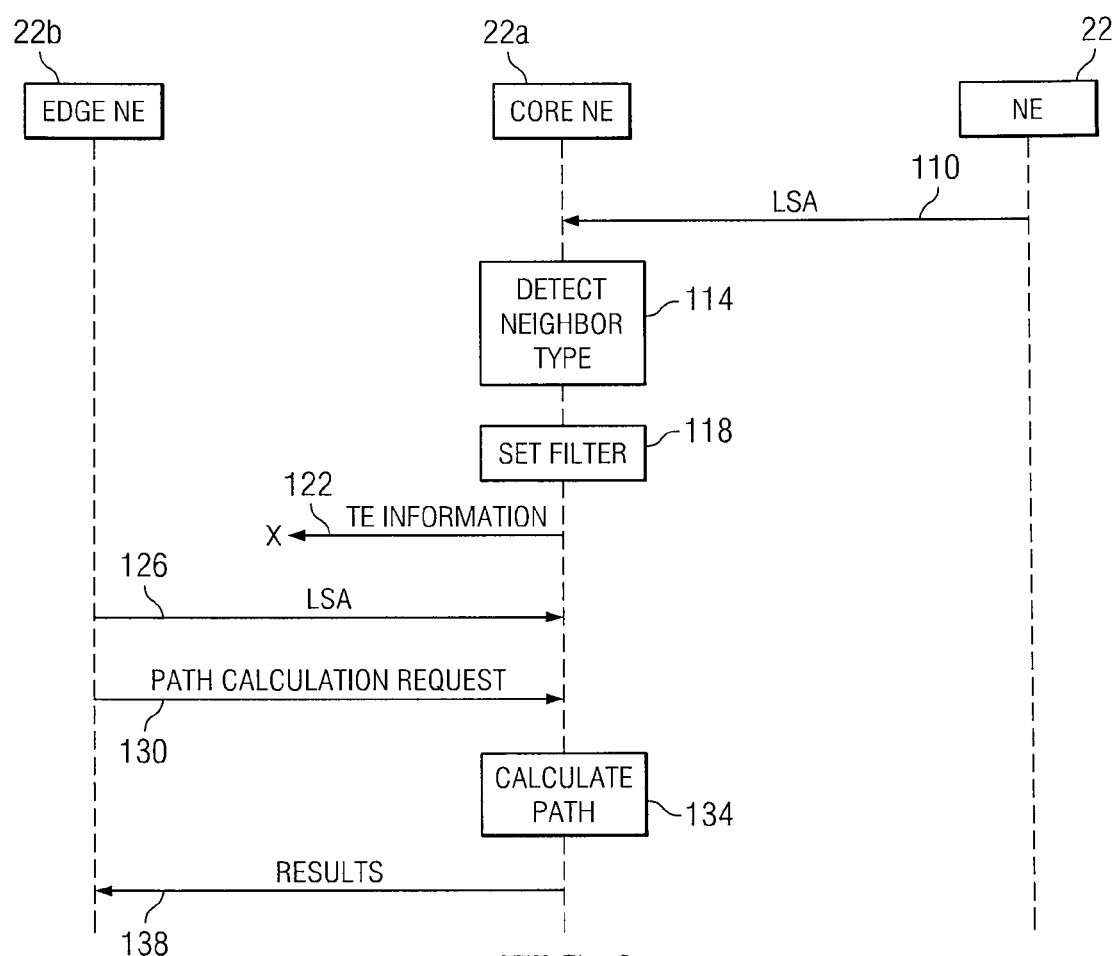
FIG. 3 illustrates an example of a method for filtering information.

Embodiments of the present invention and its advantages are best understood by referring to FIGS. 1 through 3 of the drawings, like numerals being used for like and corresponding parts of the various drawings.

FIG. 1 illustrates an embodiment of a network 10 that includes network elements 22 and spans 26. In the embodiment, network elements 22 includes core network elements 22a and edge network elements 22b. In particular embodiments, core network element 22a filters information sent to a neighboring network element 22 such as an edge network element 22b. In the embodiments, core network element 22a may determine whether the neighboring network element is an edge network element or a core network element. If the neighboring network element is an edge network element, core network element 22a may set a filter, remove traffic engineering (TE) information according to the filter, and send the remaining information to the neighboring network element.

Generalized Multiprotocol Label Switching (GMPLS) for wavelength-division multiplexing (WDM) networks includes functions such as routing and signaling. Reconfigurable optical add-drop multiplexer (ROADM) and wavelength-selective switching (WSS) technologies pose routing constraints for DWDM signals. For example, a wavelength continuity constraint specifies that wavelengths cannot be converted in pass-through nodes. Accordingly, if a certain wavelength is not available on both the incoming and outgoing links of a node then the node cannot be used as part of the connection.

To satisfy the constraints, a large amount of information needs to be flooded in order to perform path computation and/or routing at the head-end (or source) nodes. In certain cases, certain information may be filtered out. For example, core network elements need not flood routing information (in the form of link-state advertisements) to edge network elements. Edge network elements need not flood routing information to other edge network elements. Core network elements flood LSAs to core network elements. Edge network elements flood LSAs to core network elements. In addition, core network elements can perform path computation for the edge network elements.

In the illustrated embodiment, network 10 represents a communication network that allows components to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

According to the illustrated embodiment, network 10 includes a ring network 20. In one embodiment, ring network 20 communicates information through signals. A signal may comprise an optical signal transmitted as light pulses. As an example, an optical signal may have a frequency of approximately 1550 nanometers and a data rate of 10, 20, 40, or over 40 gigabits per second (G). A signal may comprise a synchronous transport signal (STS) that communicates information in packets. Information may include voice, data, audio, video, multimedia, control, signaling, and/or other information. A signal may travel through a circuit, or path, from a source network element 22 to a destination network element 22.

According to one embodiment, ring network 20 may utilize protocols such as Resilient Packet Ring (RPR) protocols, according to which packets may be added, passed through, or dropped at each network element 22. Ring network 20 may utilize any suitable routing technique, such as Generalized Multi-Protocol Label Switching (GMPLS) techniques. Ring network 20 may utilize any suitable transmission technique, such as wavelength division multiplexing (WDM) techniques.

In the illustrated embodiment, network 20 includes network elements 22 and spans 26. In particular embodiments, a network element 22 represents equipment used to provide a telecommunications service. Network element 22 may provide capabilities such as subscriber management, signaling systems, billing and collection functions, transmission and/or routing features. Examples of network elements include routers, switches, wavelength division multiplexers (WDMs), access gateways, endpoints, softswitch servers, trunk gateways, access service providers, Internet service providers, or other device operable to route packets through, to, or from ring network 20. A network element 22 may communicate with a neighboring network element 22 that is one, two, or more hops away.

In particular embodiments, network 22 has a core and an edge. A network core may perform the bulk of the centralized or generalized tasks of network 10. The network core may comprise core network elements that may include servers, clients, and/or data storage. A network edge may be the boundary of network 10, which may be coupled to endpoints and/or other networks. Network elements at the edge of network 10 may be designated as edge network elements. Examples of edge network elements include a central office. In certain embodiments, an edge network element need not have, and may lack, the ability to calculate paths, and may request that a core network element perform path calculation.

Spans 26 represent any suitable fibers operable to transmit a signal, such as optical fibers. A span 26 communicates one or more channels, where a channel represents a particular wavelength. A wavelength may be identified by a wavelength channel identifier.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

FIG. 2 illustrates one embodiment of a core network element 22a of network 10 of FIG. 1 that can filter link-state advertisement (LSA) information. The filtering may be one way. A core network element 22 may filter TE information, but edge network element 22 does not. In particular embodiments, core network element 22a may determine whether a neighboring network element 22 is an edge network element 22 or a core network element 22. If the neighboring network element 22 is an edge network element 22, core network element 22a may set a filter, remove TE information according to the filter, and send the remaining information to the neighboring network element.

In particular embodiments, core network element 22a includes an interface 50, logic 54, and memory 58. Logic includes a processor 60 and applications such as a filter 64 and a path calculator 68. In particular embodiments, filter 64 may filter routing information such as traffic engineering (TE) information. TE information describes traffic engineering topology such as bandwidth and administrative constraints. The TE information can be used to build a TE database, which may be used to monitor extended link attributes, local constraint-based source routing, and global traffic engineering. The information may be communicated in a link-state advertisement (LSA).

A link-state advertisement communicates information for the Open Shortest Path First (OSPF) routing protocol for Internet Protocol (IP). An LSA communicates a router's local routing topology to other local routers in the same OSPF area. LSAs may be used to create a graph of nodes and links, which may be used to run the SPF algorithms based on Djisktra algorithms.

An LSA may include type-length-values (TLVs) that include TE information. For example, an LSA may include a Router Address TLV and a Link TLV. The Router Address TLV specifies a stable IP address of the advertising router that is reachable if there is any connectivity to it. The address may be implemented as a loopback address that does not become unusable if an interface is down. The Link TLV may define the type of the link (for example, Point-to-point or Multi-access); the other end of the link (for example, for point-to-point links, this is the Router ID of the neighbor, and for multi-access links, this is the interface address of the designated router); and/or the IP address(es) of the interface corresponding to the link.

Opaque LSAs, such as types 9, 10, and 11 (defined by "The OSPF Opaque LSA Option," RFC 2370, The Internet Society 1988, incorporated herein by reference), are designated for application-specific purposes. For example, OSPF-Traffic Engineering (OSPF-TE) has traffic engineering extensions to be used by Resource Reservation Protocol-Traffic Engineering (RSVP-TE) in Multiprotocol Label Switching (MPLS). An opaque LSA may have a standard LSA header followed by an n-bit aligned application-specific information field, where n is any suitable number of bits, such as n=32.

Traffic engineering attributes may be as described in "OSPF Extensions to Support Inter-Area Traffic Engineering" by the OSPF Working Group (which is incorporated herein by reference). Examples of traffic engineering attributes that may be used to describe a destination element include a traffic engineering metric, hop value, maximum bandwidth, maximum reservable bandwidth, unreserved bandwidth, delay, and resource class (color).

The traffic engineering and hop metrics may be additive metrics similar to the OSPF metric, but need not be the same. The traffic engineering and hop metrics may be computed in a manner similar to the Dijkstra computation for the OSPF metric. The maximum bandwidth to the destination is the largest of the path-capacities, each associated with a possible path to the destination. That is, the maximum bandwidth is the maximum amount of traffic that can be sent to the destination, when there is no other traffic on the links. The path-capacity is the smallest link capacity of the links in the path.

The maximum reservable bandwidth specifies the maximum bandwidth that may be reserved on a possible path in the direction of the destination. The unreserved bandwidth to the destination is the largest of the path-unreserved bandwidths, each associated with a possible path to the destination. That is, the unreserved bandwidth is the maximum amount of traffic that can currently be sent to the destination, the other traffic on the links being steady. The path-unreserved bandwidth is the smallest unreserved bandwidth of the links in the path.

The delay is an additive metric and may be determined through a Dijkstra computation based on the delay. The value of the color attribute to the destination is a combination of the path-colors, each associated with a possible path to the destination. The path-color is a combination of the colors of the links in the path. The combination may be a logical "and" of the colors.

A link-state database distribution mechanism may be used to flood opaque LSAs throughout network 10. Opaque LSAs may include information that is to be flooded by routers that might not understand the extended information. For example, opaque LSAs may be used to flood link color and bandwidth information.

The link-state type field of the opaque LSA identifies the LSA's range of topological distribution, which may be referred to as the "flooding scope." Each of the three types may have a different flooding scope. For example, type-10 opaque Traffic Engineering LSA information is not flooded beyond the local (sub)network; type-10 opaque LSAs are not flooded beyond the borders of their associated area; and type-11 opaque LSAs are 1) flooded throughout transit areas, 2) not flooded into stub areas from the backbone, and 3) not originated by routers into their connected stub areas.

In particular embodiments, filter 64 may filter out opaque type 10 LSA information. A type 10 LSA may be used for traffic engineering extensions to OSPF, flooding information about links beyond just their metric, such as link bandwidth and color (or resource class). The filtering may be performed when syncronizing the link-state database (LSDB) with the PCC network element.

In particular embodiments, a path calculator 48 of network element 22 calculates the path for a circuit. In particular embodiments, path calculator 48 may comprise a path computation element (PCE) or path computation client (PCC) that includes shortest path first (CSPF), explicit route object (ERO), or other suitable path calculation engine.

In particular embodiments, path calculator 48 may determine the whether the neighboring network element is an edge network element or a core network element according to node type information distributed in a LSA. If the neighboring network element is an edge network element, path calculator 48 may set filter 64 to remove traffic engineering (TE) information from the LSA according to the filter, and send the remaining information to the neighboring network element.

FIG. 3 illustrates an example of a method for filtering LSA information. In particular embodiments, the method starts at step 110, where a network element 22 sends an LSA to core network element 22a. The LSA may identify a neighboring network element 22 as an edge network element 22b. Core network element 22a determines from the LSA that neighboring network element 22 is an edge network element 22b at step 114.

Core network element 22a sets filter 64 at step 118. Filter 64 may be set to filter out TE information. TE information is filtered out at step 122. Core network element 22a receives an LSA from edge network element 22b at step 126 that does not include the TE information.

Core network element 22a receives a path calculation request from edge network element 22b at step 130. The path calculation request requests path calculation for edge network element 22b. Path calculator 68 calculates a path for edge network element 22b at step 134. Core network element 22a sends the results to edge network element 22b at step 138.

Modifications, additions, or omissions may be made to the methods without departing from the scope of the invention. The method may include more, fewer, or other steps. Additionally, steps may be performed in any suitable order.

Certain embodiments of the invention may provide one or more technical advantages. A technical advantage of one embodiment may be that a core network element filters information sent to an edge network element. Filtering the information reduces the amount of information that is transmitted, which may allow for space to transmit other information.

Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    receiving a link-state advertisement at a core network element of a network;
    determining whether a neighboring network element is an edge network element or a core network element;
    if the neighboring network element is an edge network element of the same network as the core network element:
        setting a filter;
        removing traffic engineering information from the link-state advertisement according to the filter to yield remaining information, the traffic engineering information comprising information used in the network to build a traffic engineering database, the traffic engineering information comprising one or more of the following types of information: a traffic engineering metric, a hop value, a maximum bandwidth, a maximum reservable bandwidth, an unreserved bandwidth, delay, and a resource class;
        sending the remaining information to the neighboring network element;

receiving a request for a path calculation at the core network element from the edge network element, the edge network element lacking a path calculating ability;

performing the path calculation at the core network element using the traffic engineering information; and sending results of the path calculation to the edge network element.

2. The method of claim 1, further comprising:

if the neighboring network element is a core network element, sending the traffic engineering information to the neighboring network element.

3. The method of claim 1, the determining whether a neighboring network element is an edge network element or a core network element further comprising:

determining whether the neighboring network element is an edge network element or a core network element according to the link-state advertisement information.

4. The method of claim 1, the link-state advertisement comprising a type-10 link-state advertisement.

5. The method of claim 1, the neighboring network element comprising a central office.

6. One or more non-transitory computer readable media encoded with computer executable instructions configured to:

receive a link-state advertisement at a core network element of a network;

determine whether a neighboring network element is an edge network element or a core network element;

if the neighboring network element is an edge network element of the same network as the core network element:

set a filter;

remove traffic engineering information from the link-state advertisement according to the filter to yield remaining information, the traffic engineering information comprising information used in the network to build a traffic engineering database, the traffic engineering information comprising one or more of the following types of information: a traffic engineering metric, a hop value, a maximum bandwidth, a maximum reservable bandwidth, an unreserved bandwidth, delay, and a resource class;

send the remaining information to the neighboring network element;

receive a request for a path calculation at the core network element from the edge network element, the edge network element lacking a path calculating ability;

perform the path calculation at the core network element using the traffic engineering information; and send results of the path calculation to the edge network element.

7. The computer readable media of claim 6, the instructions further configured to:

if the neighboring network element is a core network element, send the traffic engineering information to the neighboring network element.

8. The computer readable media of claim 6, the instructions further configured to determine whether a neighboring network element is an edge network element or a core network element by:

determining whether the neighboring network element is an edge network element or a core network element according to the link-state advertisement information.

9. The computer readable media of claim 6, the link-state advertisement comprising a type-10 link-state advertisement.

10. The computer readable media of claim 6, the neighboring network element comprising a central office.

11. An apparatus comprising:

a memory configured to store a link-state advertisement at a core network element of a network; and a processor configured to:

determine whether a neighboring network element is an edge network element or a core network element;

if the neighboring network element is an edge network element of the same network as the core network element:

set a filter;

remove traffic engineering information from the link-state advertisement according to the filter to yield remaining information, the traffic engineering information comprising information used in the network to build a traffic engineering database, the traffic engineering information comprising one or more of the following types of information: a traffic engineering metric, a hop value, a maximum bandwidth, a maximum reservable bandwidth, an unreserved bandwidth, delay, and a resource class;

send the remaining information to the neighboring network element;

receive a request for a path calculation at the core network element from the edge network element, the edge network element lacking a path calculating ability;

perform the path calculation at the core network element using the traffic engineering information; and send results of the path calculation to the edge network element.

12. The apparatus of claim 11, the processor further configured to:

if the neighboring network element is a core network element, send the traffic engineering information to the neighboring network element.

13. The apparatus of claim 11, the processor further configured to determine whether a neighboring network element is an edge network element or a core network element by:

determining whether the neighboring network element is an edge network element or a core network element according to the link-state advertisement information.

* * * * *